April 28, 1970  C. H. SNYDER, JR  3,508,580
FLUID-TIGHT COUPLING FOR LATERALLY MISALIGNED CONDUITS
Filed Sept. 12, 1967  2 Sheets-Sheet 1

INVENTOR.
CLIFFORD H. SNYDER, JR.
BY George Raymovich Jr.
HIS ATTORNEY

United States Patent Office 3,508,580
Patented Apr. 28, 1970

3,508,580
FLUID-TIGHT COUPLING FOR LATERALLY MISALIGNED CONDUITS
Clifford H. Snyder, Jr., Coraopolis, Pa., assignor to SRM Company, a corporation of Pennsylvania
Filed Sept. 12, 1967, Ser. No. 667,284
Int. Cl. F16l 37/22, 37/28
U.S. Cl. 137—614.04
8 Claims

ABSTRACT OF THE DISCLOSURE

A fluid-tight coupling of the type utilizing radially movable locking balls to retain a nipple within a housing is provided with an automatic nipple-release piston-cylinder arrangement and with a floating connection between the nipple and the conduit connected to the nipple so that the nipple can be moved relative to the conduit to engage the coupling even though the conduits are laterally offset. The housing of the coupling is provided with a funnel shaped inlet to receive and guide the nipple into the housing even though the nipple and housing may initially be laterally offset from each other. The funnel-like inlet of the housing causes the nipple to move relative to the conduit to which it is attached so that the nipple can be engaged into the housing. The nipple is connected to its conduit by a radially oversize flange that moves in all directions normal to the axis of the nipple within an oversize flange-receiving body formed on the conduit. The automatic piston-cylinder release means on the housing permits fluid under pressure to retract the locking sleeve and thereby permit the nipple to be withdrawn from the housing itself.

BACKGROUND OF THE INVENTION

In many industrial applications, it is necessary to rapidly engage and disengage couplings in an automatic or semi-automatic manner. In many manufacturing and industrial processes, couplings must be engaged and disengaged with regularity several times a minute. Often, these couplings are parts of rotating machinery which are indexed to stop, have a coupling engaged, perform a liquid transfer, and disengage the coupling before rotating to the next position.

In the foregoing types of applications, it is extremely difficult to engage and disengage the coupling automatically and rapidly since the positioning of the two coupling halves is often not precisely determined so that the coupling halves may be laterally misaligned. In such instances, provision must be made to laterally align the coupling halves so that they may be engaged. Further, once engaged, provision must be made for rapidly disengaging the coupling.

SUMMARY

The present invention is directed to a novel, efficient coupling for rapidly and automatically connecting and disconnecting fluid conduits that may be laterally misaligned at the time of coupling engagement. Basically, the coupling housing of the present invention is provided with a funnel-like inlet which guides the nipple of the coupling toward the center of the housing where it is engaged. The housing contains an axially movable valve which is normally closed and which is opened by the engagement of the nipple into the housing.

The nipple of the present invention is floatingly connected to its conduit by the use of an oversize circular flange arrangement which slidingly moves relative to a flange-receiving body that is fixed to the conduit. The combination of the oversize radially extending flange and the still larger flange-receiving body on the conduit permits the nipple to assume various laterally offset positions relative to the axis of the conduit to which it is attached. At the same time, an enlarged conduit mouth is provided so that the fluid conduit remains constantly in fluid communication with the nipple of the coupling.

The coupling is of the type that when the nipple is inserted, the coupling is automatically engaged without further action being required. To disengage the coupling, fluid pressure is applied to a fixed piston-annular cylinder arrangement which causes a release mechanism on the coupling to operate. The coupling has a collar arrangement which locks a plurality of lock balls around the nipple to hold the nipple axially engaged. When fluid pressure is provided to the release means, the lock collar is withdrawn to permit the lock balls to move radially outwardly and the nipple to be withdrawn from the housing.

With the foregoing considerations in mind, it is an object of the present invention to provide an improved fluid-tight coupling.

Another object of the present invention is to provide a fluid-tight coupling for automatically and rapidly connecting and disconnecting fluid conduits that may be laterally misaligned from each other at the time of coupling engagement.

Another object of the present invention is to provide a fluid-tight coupling wherein a nipple of the coupling is floatingly connected to its conduit whereby the nipple can move relative to the conduit to accommodate itself for lateral misalignment.

Another object of the present invention is to provide a fluid-tight coupling having a funnel-like inlet on the housing to receive the nipple which may be laterally offset from the housing.

These and other objects of the present invention will become apparent as this description proceeds in conjunction with the accompanying drawings.

DESCRIPTION OF THE PREFERRED EMBODIMENT

Figure 1:
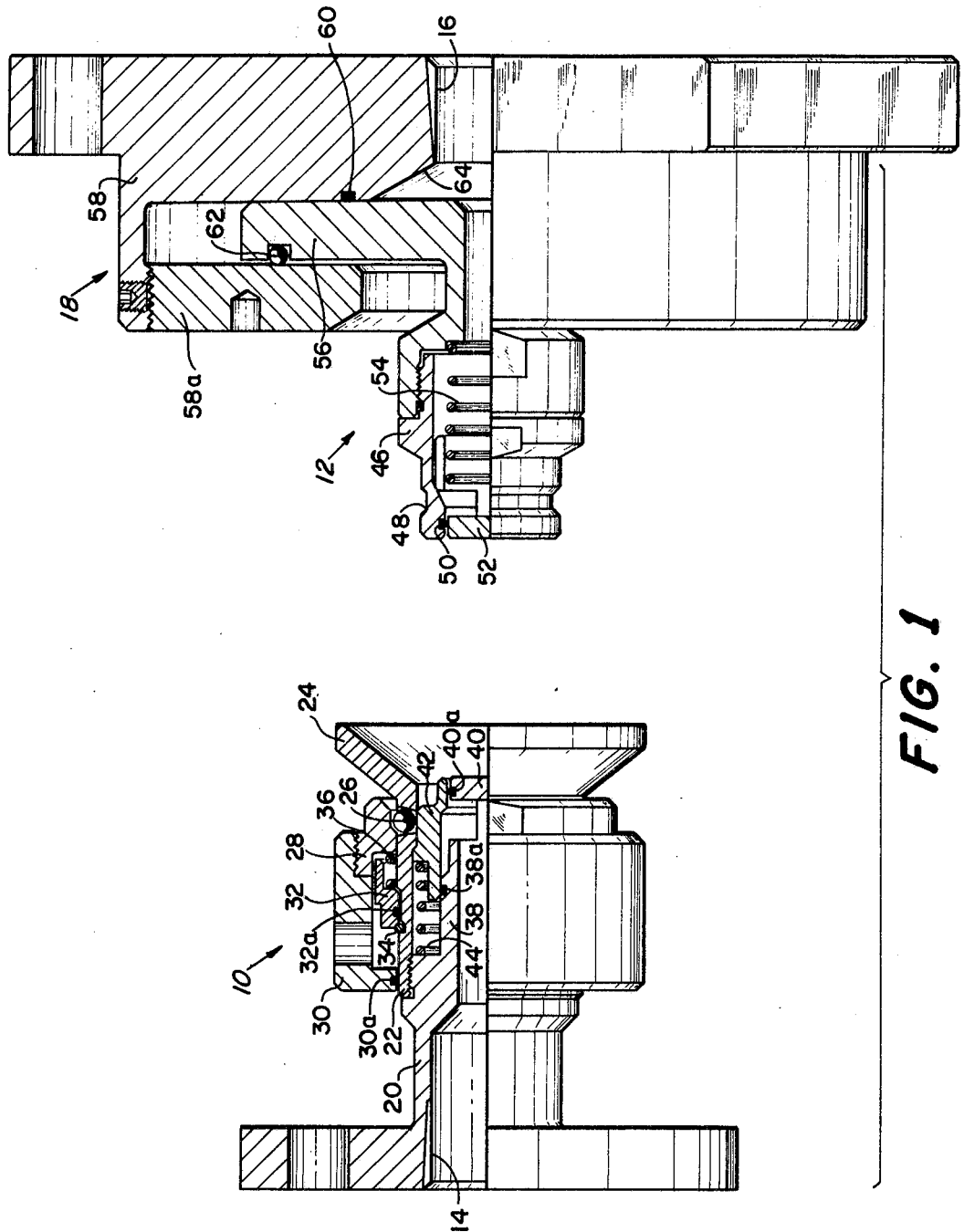
FIGURE 1 is a partial sectional view of the coupling of the present invention in the disengaged position.

Referring to the drawings, there is shown a coupling having a housing 10 and a nipple 12. A first fluid conduit 14 is fixed to the housing 10 and a second fluid conduit 16 is connected to the nipple 12 by a floating connection indicated generally at 18.

The housing 10 has a housing body 20 which is generally cylindrical in shape and threadingly receives the cylindrical ball-receiving member 22 that extends outwardly and flares out to form the funnel-like nipple-receiving inlet 24. A plurality of lock balls 26 are disposed around the periphery of ball-receiving member 22 so that the lock balls 26 move radially inwardly and outwardly relative to the cylindrical ball-receiving member 22. When the lock balls 26 are moved inwardly into the space within the cylindrical ball-receiving member 22, they are in a position to lock the nipple 12 within the housing.

Disposed over the lock balls 26 is a locking collar 28 which when it is in the position shown in FIGURE 1 permits the lock balls 26 to be moved outwardly radially to release the nipple from the housing. When the lock balls are in the position shown in FIGURE 2, with collar 28 bearing against the lock balls 26, the lock balls are moved radially inwardly to lock the nipple within the housing 10.

Connected to the locking collar 28 is an annular lock release cylinder 30. An O-ring seal 30a on cylinder 30 seals the annular cylinder 30 against the cylindrical ball-receiving member 22. A fixed piston 32 is fixed to cylindrical ball-receiving member 22 by a snap ring 34. An O-ring seal 32a seals the fixed piston 32 to the member 22.

Figure 2:
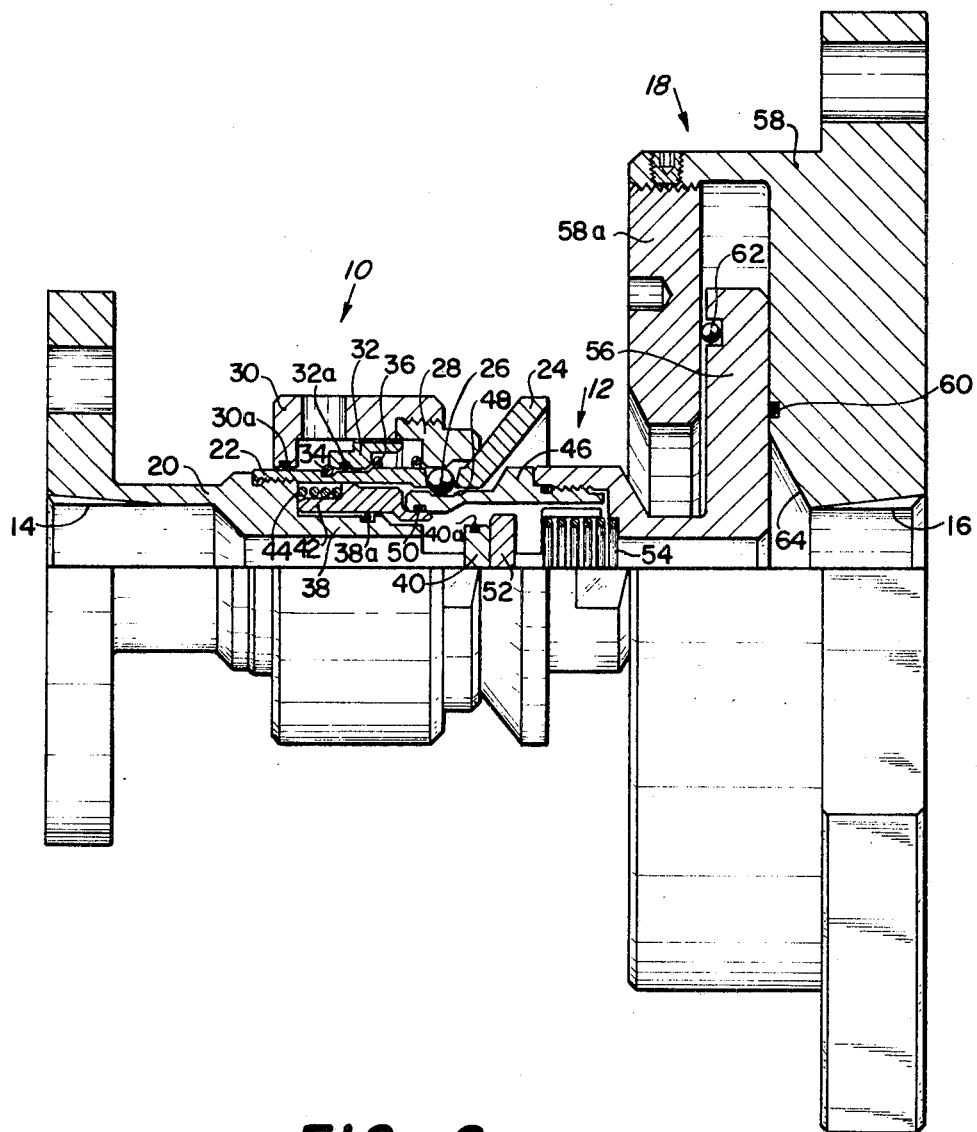
FIGURE 2 is a partial sectional view of the coupling of the present invention in the engaged position.

A helical spring 36 disposed between fixed piston 32 and locking collar 28 urges the locking collar toward the right as viewed in FIGURES 1 and 2 and urges the locking collar 28 toward the locked position.

The housing body 20 has a valve-receiving cylinder 38 formed integrally therewith and extending therefrom. An O-ring seal 38a is provided on the outer surface of valve-receiving cylinder 38. The end of valve-receiving cylinder 38 is a face plate 40 having an O-ring seal 40a in the periphery thereof.

A cylindrical valve 42 is slidingly disposed over the valve-receiving cylinder 38 and is sealingly contacted by O-ring 38a and 40a. The helical spring 44 positioned over valve-receiving cylinder 38 urges the cylindrical valve 32 to the closed position as shown in FIGURE 1, or to the right as viewed in FIGURE 1.

The nipple 12 is formed from a nipple body 46 which has an annular lock recess 48 formed on the outer cylindrical surface thereof. An O-ring 50 on the internal cylindrical surface of nipple body 46 seals against valve 52 when valve 52 is in the closed position as shown in FIGURE 1. Valve 52 is urged to the closed position shown in FIGURE 1, or to the left as shown in FIGURE 1, by a helical spring 54 disposed between the valve 52 and the nipple.

The nipple 12 has a radially oversize circular flange 56 formed thereon. Radially oversize flange 56 is stridingly received within a flange-receiving body 58 formed on second fluid conduit 16. The flange-receiving body 58 is closed by a cover plate 58a threaded into the flange-receiving body 58. An O-ring seal 60 between the oversize circular flange 56 and the flange-receiving body 58 prevents leakage of fluid from the fluid conduit 16 beyond the O-ring seal 60.

Ball bearings 62 are disposed between the flange 56 and the flange-receiving body 58 to promote ease of movement between the nipple 12 and the fluid conduit 16. The second fluid conduit 16 has an enlarged conduit mouth 64 of such size that no matter what position nipple 12 assumes relative to conduit 16, there is full fluid communication between conduit 16 and the internal passage within nipple 12.

In operation, the coupling is in the disengaged position as shown in FIGURE 1. When in this position, valve 42 of housing 10 is in the position shown in FIGURE 1 and closes the housing 10 to the passage of fluid there-through. In a like manner, valve 52 of nipple 12 is in a closed position and closes the passage of fluid therethrough. To engage the coupling, the nipple 12 is brought into the funnel-like nipple-receiving inlet 24. If the conduit 14 and conduit 16 are not laterally aligned, the action of nipple 12 coming against inlet 24 causes the floating connection 18 between nipple 12 and conduit 16 to permit movement of the nipple 12 relative to conduit 16. Basically, the radially oversize circular flange 56 slides within the flange-receiving body 58 until the nipple tends to center itself within the funnel-like nipple-receiving inlet 24.

As the nipple 12 further enters the housing 10, the end of nipple body 46 contacts the valve 42 and urges it against the force of helical spring 44 toward the left or open position as viewed in FIGURE 1. The cylindrical valve 42 is so positioned that it holds the lock balls 26 into the radially outward position causing the locking collar 28 to remain slightly to the left of the fully extended position, the fully extended position being shown in FIGURE 2 and the modified position being shown in FIGURE 1. As the nipple body 46 urges the vlave 42 inwardly, the lock balls are forced radially inwardly until the annular lock recess 48 on the nipple is aligned with the lock balls. At that point, the lock balls enter the recess, and the collar 28, under the force of helical spring 36, moves over the lock balls and holds them within the annular recess 48. As this occurs, the cylindrical valve 42 is moved to the left as shown in FIGURE 2 so that it is in the open position. At the same time, the face plate 40 within the housing contacts the nipple valve causing it to be moved to the right against the force of spring 54 so that it is also in the open position. FIGURE 2 shows the coupling engaged, with both valves 42 and 52 in the open position.

When it is desired to release the coupling, fluid under pressure is admitted into the annular chamber formed between annular lock release cylinder 30, fixed piston 32, and cylindrical ball-receiving member 22. When fluid under pressure is so admitted, the fixed piston 32 remains stationary and the cylindrical annular lock release cylinder 30 is moved to the left as viewed in FIGURES 1 and 2. When so moved, the locking collar 28 also moves to the left, permitting lock balls 26 to be radially withdrawn from annular recess 48 in nipple body 46 and thereby permitting the nipple to be withdrawn from the housing 10.

It may be seen that by providing the oversize flange 56 and the flange-receiving body 58, the lateral positions of the two fluid conduits 14 and 16 are not critical since the nipple 12 can center itself in nipple-receiving inlet 24 and ultimately engage within the housing 10.

According to the provisions of the patent statutes, I have explained the principle, preferred construction, and mode of operation of my invention, and have illustrated and described what I now consider to represent its best embodiment. However, I desire to have it understood that, within the scope of the appended claims, the invention may be practiced otherwise than as specifically illustrated and described.

What is claimed is:

1. A coupling for automatically and rapidly connecting in locked relationship and disconnecting first and second fluid conduits that may be laterally misaligned at the time of coupling engagement comprising:

(a) a housing fixed to said first conduit in fluid communication therewith, said housing having a funnel-like nipple-receiving inlet, lock means to axially lock a nipple within said housing upon insertion of a nipple therein comprising a plurality of lock balls spaced about the circumference of said housing and movable radially relative to said housing to an inward position wherein said balls are held by a locking collar to lock said nipple within said housing and to an outward position wherein said nipple is released, and said nipple lock means comprises an annular recess to receive said lock balls, and lock release means actuatable to release a nipple from said housing lock means comprising a fixed piston attached to the housing by a snap ring and a movable fluid operated annular cylinder actuable to move said locking collar to a position where said lock balls may be moved radially outwardly to release said nipple;

(b) a nipple connected to said second conduit in constant fluid communication therewith, said nipple having lock means thereon to cooperate with said housing lock means to lock said nipple within said housing upon insertion of said nipple into said housing funnel-like nipple-receiving inlet; and (c) a floating connection between said nipple and said second conduit, said floating connection comprising a radially oversize circular flange formed on said nipple at one end thereof, a flange-receiving body formed on said second fluid conduit and adapted to receive said oversize flange so that said nipple can move relative to said second conduit in all directions normal to the axes of said flange and said flange-receiving body, seal means sealingly connecting said flange and said flange-receiving body whereby said nipple and said second conduit remain in constant fluid communication and the pressures within said nipple and said second conduit remain equal no matter what position said nipple assumes relative to said second conduit.

2. The coupling of claim 1 wherein said housing lock means comprises a plurality of lock balls spaced about the circumference of said housing and movable radially relative to said housing to an inward position wherein said balls are held by a locking collar to lock said nipple within said housing and to an outward position wherein said nipple is released, and said nipple lock means comprises an annular recess to receive said lock balls.

3. The coupling of claim 2 wherein said lock release means comprises a fixed piston and a movable fluid operated annular cylinder actuatable to move said locking collar to a position where said lock balls may be moved radially outwardly to release said nipple.

4. The coupling of claim 1 wherein anti-friction bearings are positioned between said flange and said flange-receiving body to ease relative movement between said nipple and said second conduit.

5. The coupling of claim 1 wherein a valve is positioned within said housing to normally prevent fluid passage through said housing and is opened by the insertion of said nipple into said housing.

6. The coupling of claim 1 wherein a valve is positioned within said nipple to normally prevent fluid passage through said nipple and is opened by the insertion of said nipple into said housing.

7. The coupling of claim 1 wherein a first valve is positioned within said housing to normally prevent fluid passage through said housing and wherein a second valve is positioned within said nipple to normally prevent fluid passage through said nipple and wherein the coupling action of said housing and said nipple causes said first and said second valves to open.

8. The coupling of claim 7 wherein anti-friction bearings are positioned between said flange and said flange-receiving body to ease relative movement between said nipple and said second conduit.

References Cited

UNITED STATES PATENTS 2,921,436    1/1960    Canner.
3,337,181    8/1967    Wennerstrom _____ 285—178

FOREIGN PATENTS 196,437    1958    Austria.

WILLIAM F. O'DEA, Primary Examiner

H. COHN, Assistant Examiner

U.S. Cl. X.R.

285—178, 86